Figure 2:
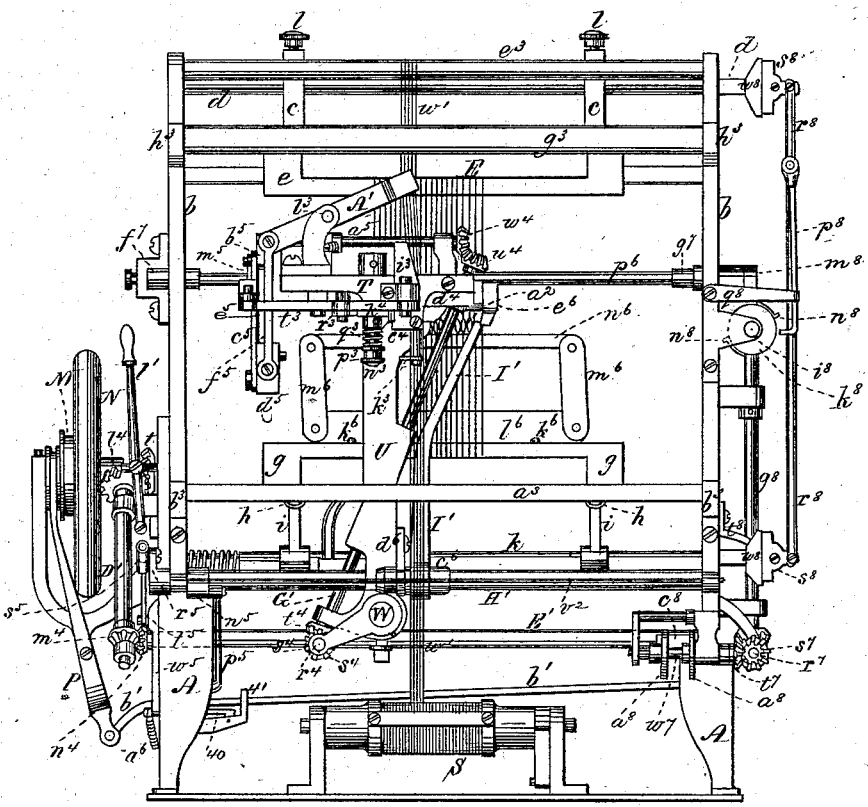
Figure 26:
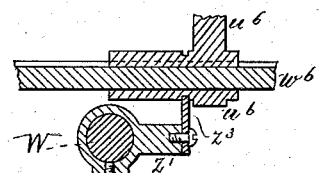

(Model.) 10 Sheets—Sheet 1.
L. P. SHERMAN, R. H. INGERSOLL & G. MOORE.
MACHINE FOR DRAWING IN WARP THREADS.
No. 255,038. Patented Mar. 14, 1882.
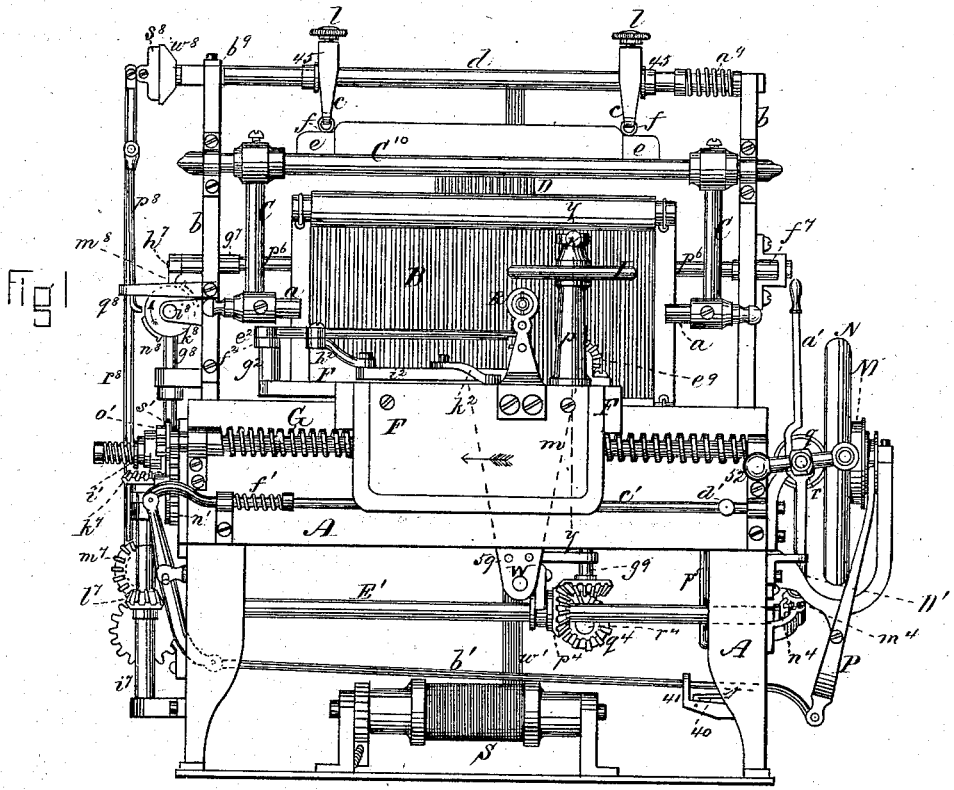
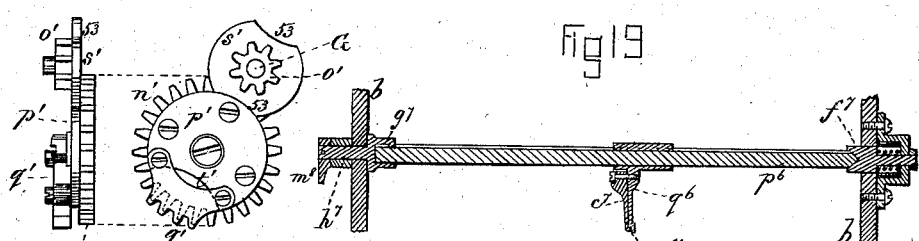
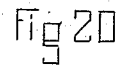
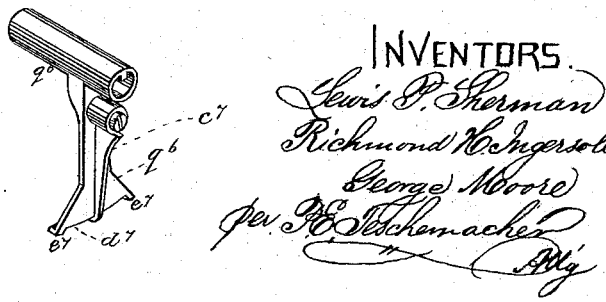
WITNESSES
W. J. Cambridge
Chas. E. Griffin
INVENTORS
Lewis P. Sherman
Richmond H. Ingersoll
George Moore
per P. E. Teschemacher
Atty (Model.) 10 Sheets—Sheet 2.

L. P. SHERMAN, R. H. INGERSOLL & G. MOORE.
MACHINE FOR DRAWING IN WARP THREADS.

No. 255,038. Patented Mar. 14, 1882.

WITNESSES.
W. J. Cambridge
Chas. E. Griffin

INVENTORS
Lewis P. Sherman
Richmond H. Ingersoll
George Moore
per H. E. Teschemacher
Atty N. PETERS. Photo-Lithographer, Washington, D. C.

(Model.) 10 Sheets—Sheet 3.

L. P. SHERMAN, R. H. INGERSOLL & G. MOORE.
MACHINE FOR DRAWING IN WARP THREADS.

No. 255,038. Patented Mar. 14, 1882.

WITNESSES
W. J. Cambridge
Chas. E. Griffin

INVENTORS
Levi P. Sherman
Richmond H. Ingersoll
George Moore
per T. E. Teschemacher
Atty (Model.) 10 Sheets—Sheet 4.
L. P. SHERMAN, R. H. INGERSOLL & G. MOORE.
MACHINE FOR DRAWING IN WARP THREADS.
No. 255,038. Patented Mar. 14, 1882.

WITNESSES
W. J. Cambridge
Chas. E. Griffin

INVENTORS
Lewis P. Sherman
Richmond H. Ingersoll
George Moore
per J. B. Teschemacher
Atty (Model.) 10 Sheets—Sheet 5.
L. P. SHERMAN, R. H. INGERSOLL & G. MOORE.
MACHINE FOR DRAWING IN WARP THREADS.
No. 255,038. Patented Mar. 14, 1882.
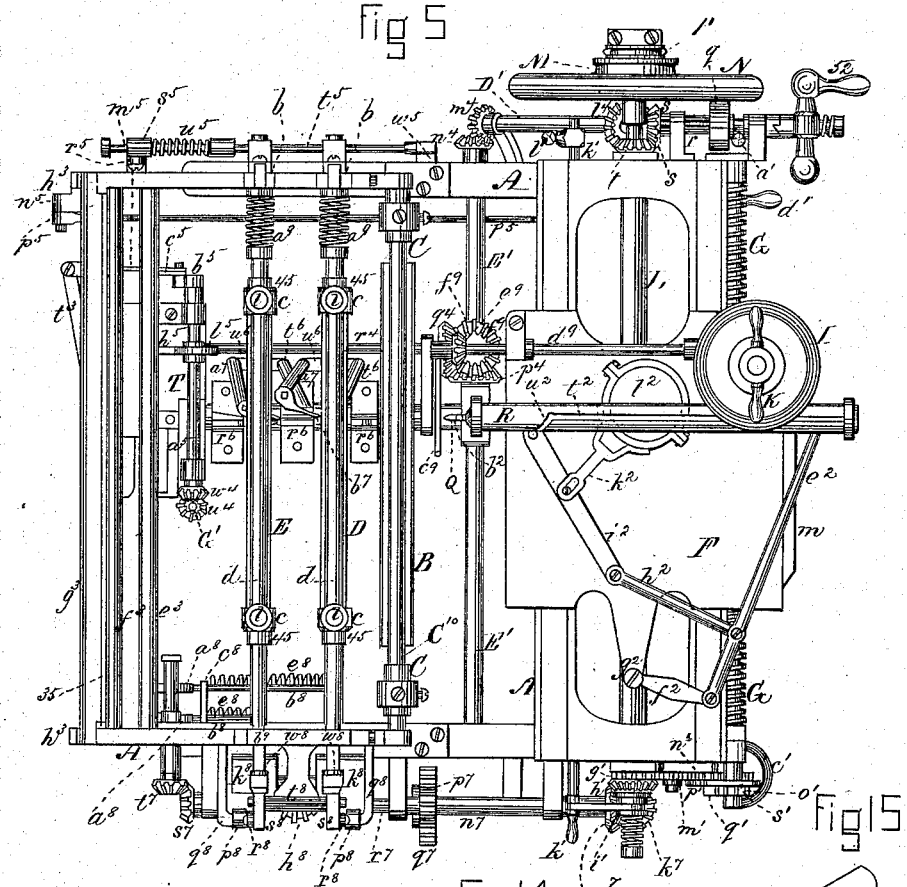
WITNESSES
W. J. Cambridge
Chas. E. Giffin
INVENTORS
Lewis P. Sherman
Richmond H. Ingersoll
George Moore
per P. E. Teschemacher Atty
N. PETERS. Photo-Lithographer, Washington, D. C.

(Model.) 10 Sheets—Sheet 6.
L. P. SHERMAN, R. H. INGERSOLL & G. MOORE.
MACHINE FOR DRAWING IN WARP THREADS.
No. 255,038. Patented Mar. 14, 1882.
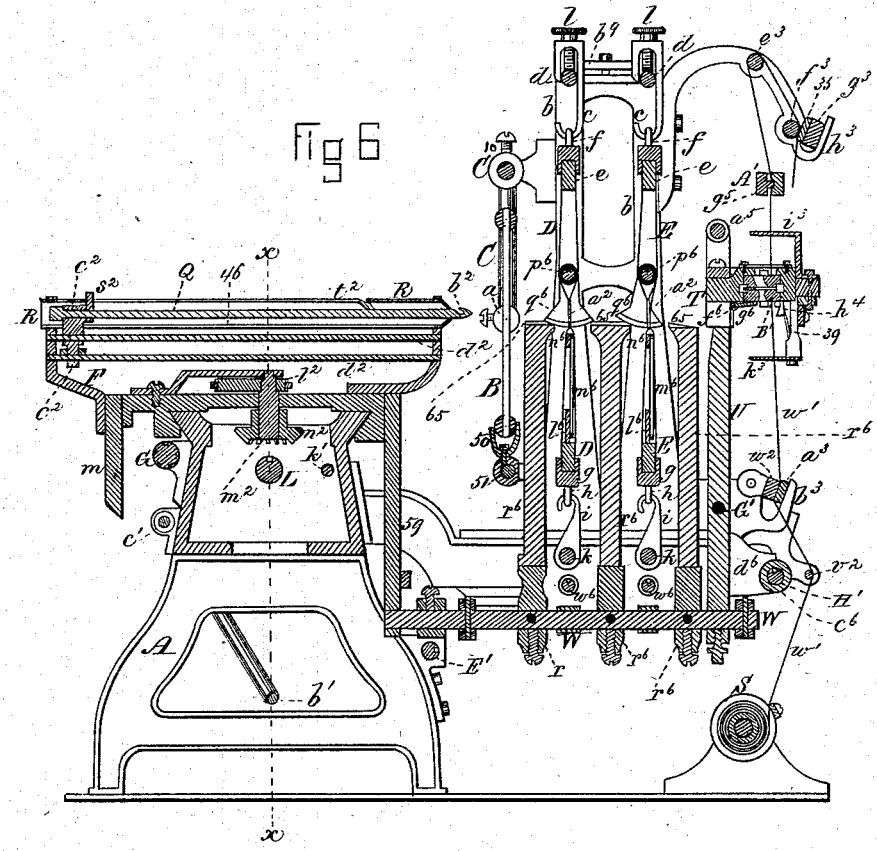
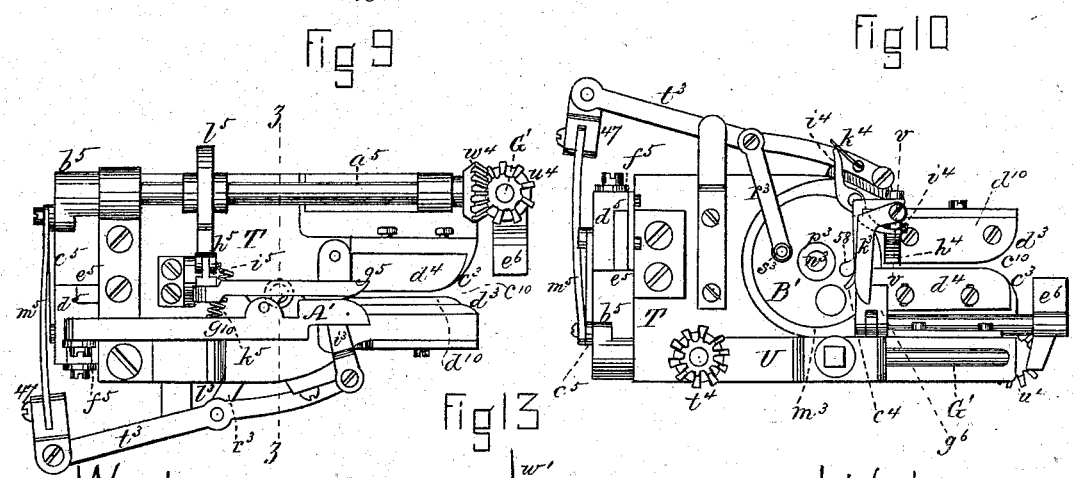
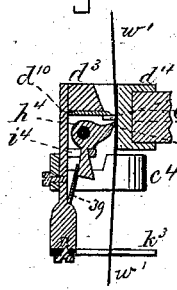
WITNESSES
W. A. Cambridge
Chas. E. Griffin
INVENTORS
Lewis P. Sherman
Richmond H. Ingersoll
George Moore
per F. Teschemacher
Atty.
N. PETERS. Photo-Lithographer, Washington, D. C.

(Model.) 10 Sheets—Sheet 7.
L. P. SHERMAN, R. H. INGERSOLL & G. MOORE.
MACHINE FOR DRAWING IN WARP THREADS.
No. 255,038. Patented Mar. 14, 1882.
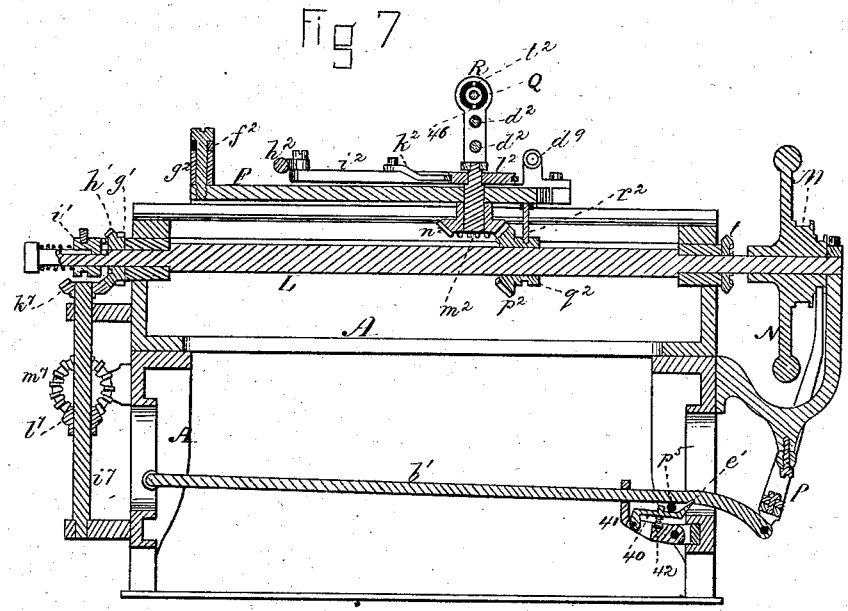
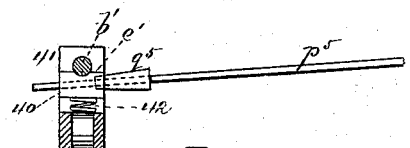
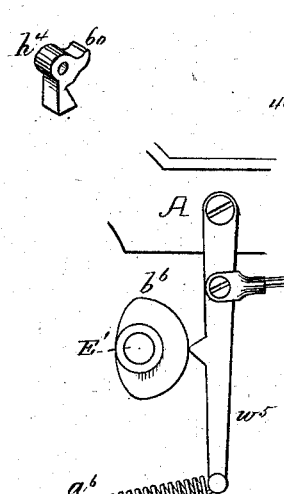
WITNESSES
INVENTORS (Model.) 10 Sheets—Sheet 8.
L. P. SHERMAN, R. H. INGERSOLL & G. MOORE.
MACHINE FOR DRAWING IN WARP THREADS.
No. 255,038. Patented Mar. 14, 1882.
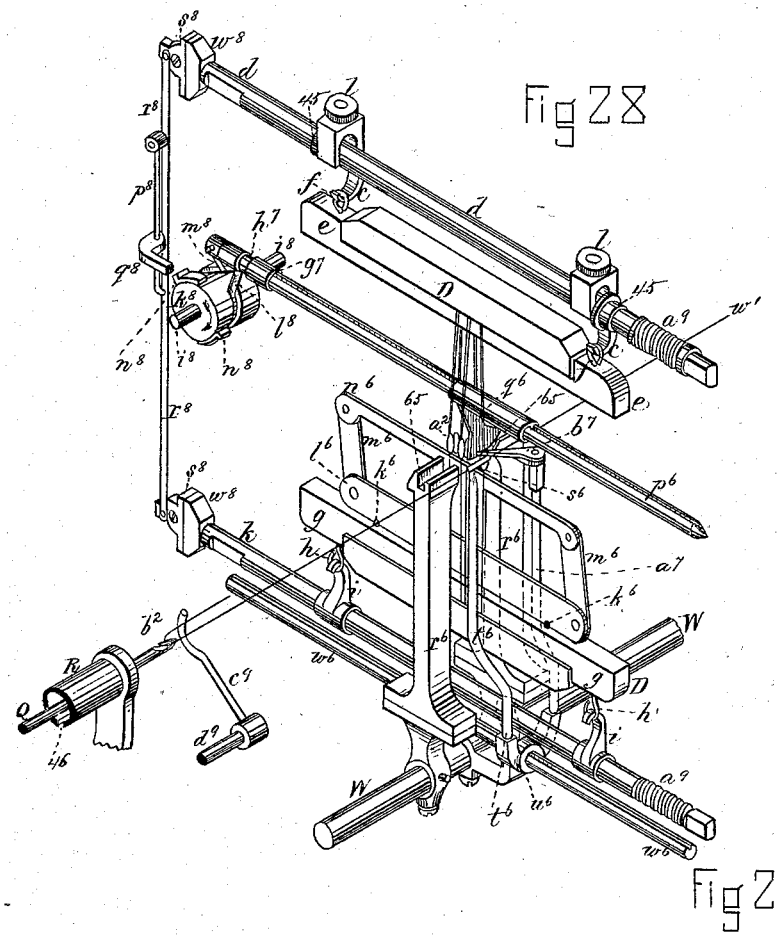
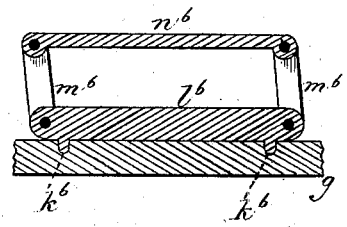
WITNESSES
INVENTORS (Model.) 10 Sheets—Sheet 9.
L. P. SHERMAN, R. H. INGERSOLL & G. MOORE.
MACHINE FOR DRAWING IN WARP THREADS.
No. 255,038. Patented Mar. 14, 1882.
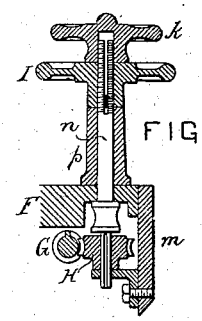
FIG. 8.
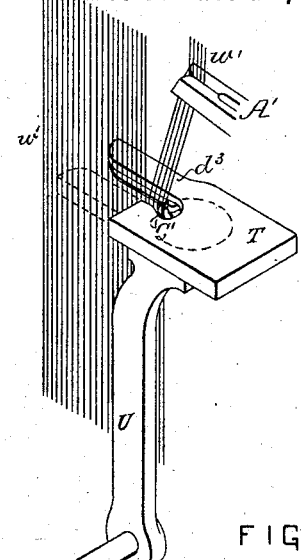
FIG. 36.
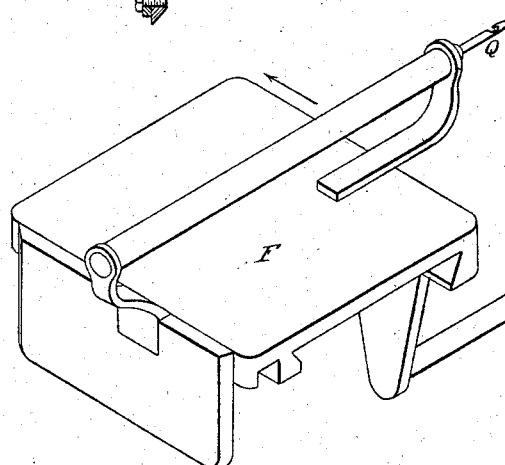
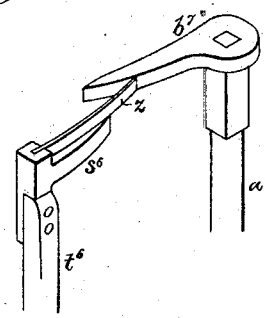
FIG. 34.
FIG. 27.
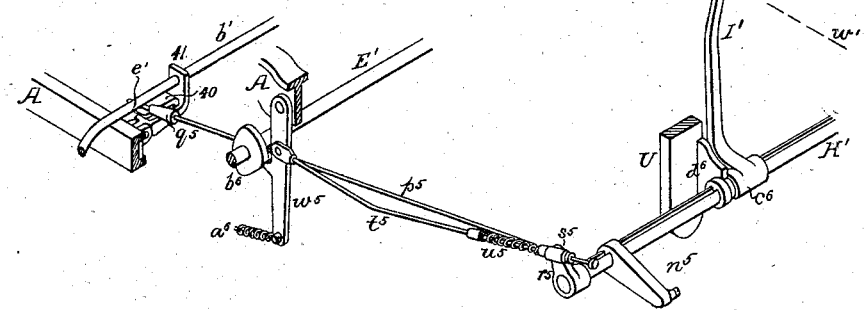
WITNESSES:
Jas. L. Skidmore
E. J. Nottingham
INVENTORS:
L. P. Sherman, R. H. Ingersoll
and George Moore
by their Attorneys
Howson and Sons

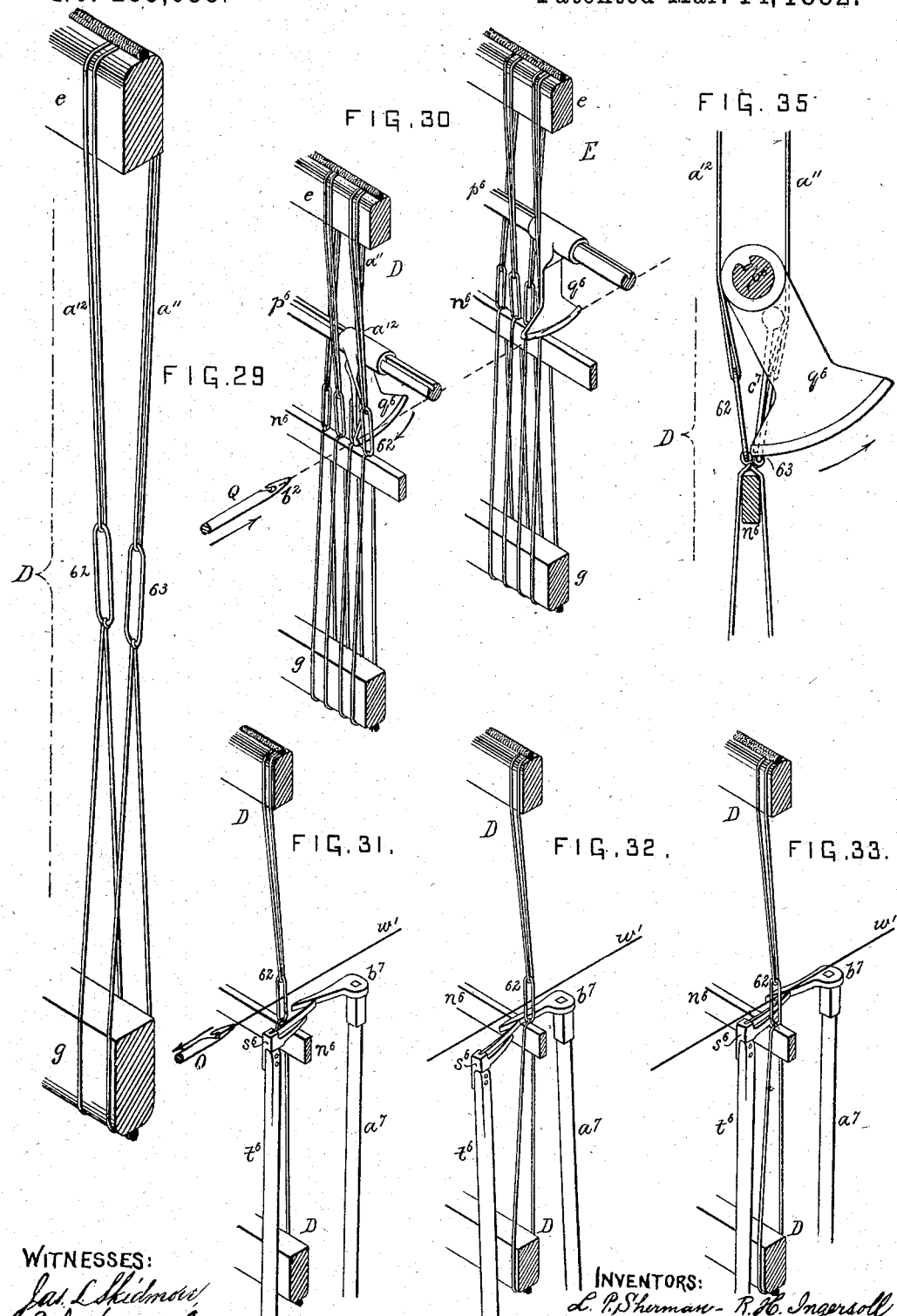

UNITED STATES PATENT OFFICE.

LEWIS P. SHERMAN AND RICHMOND H. INGERSOLL, OF BIDDEFORD, AND GEORGE MOORE, OF BERWICK, MAINE.

MACHINE FOR DRAWING IN WARP-THREADS.

SPECIFICATION forming part of Letters Patent No. 255,038, dated March 14, 1882.

Application filed June 11, 1881. (Model.)

*To all whom it may concern:*

Be it known that we, LEWIS P. SHERMAN and RICHMOND H. INGERSOLL, of Biddeford, in the county of York and State of Maine, and GEORGE MOORE, of Berwick, in the county and State aforesaid, have invented a Machine for Drawing in Warp-Threads; and we do hereby declare the following to be a full, clear, and exact description of the same, reference being had to the accompanying drawings, in which—

Figure 3:
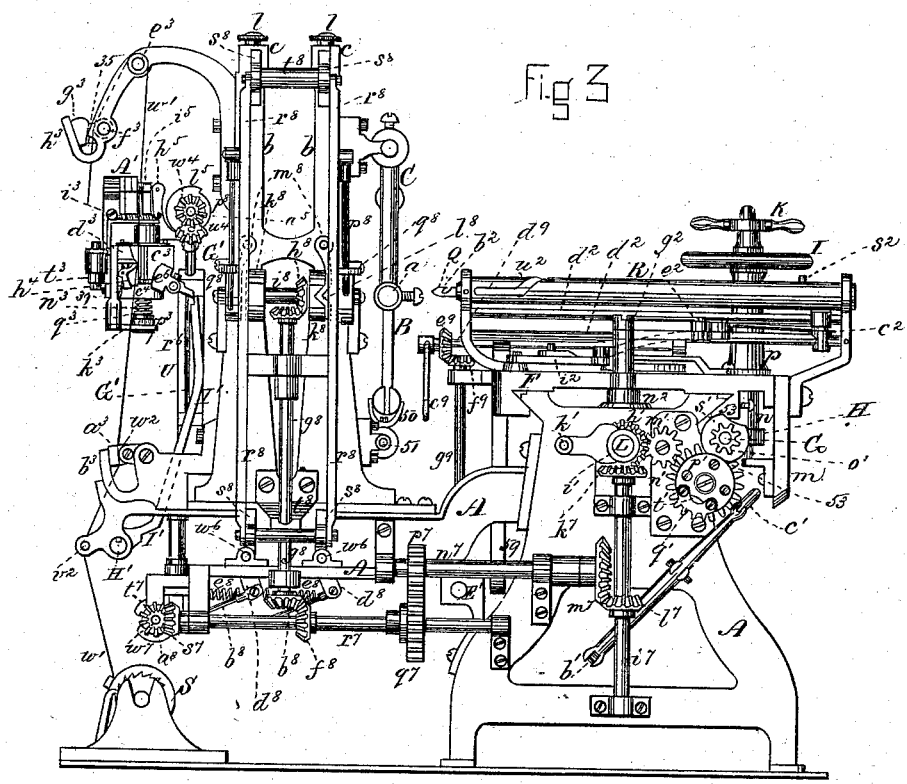
Figure 4:
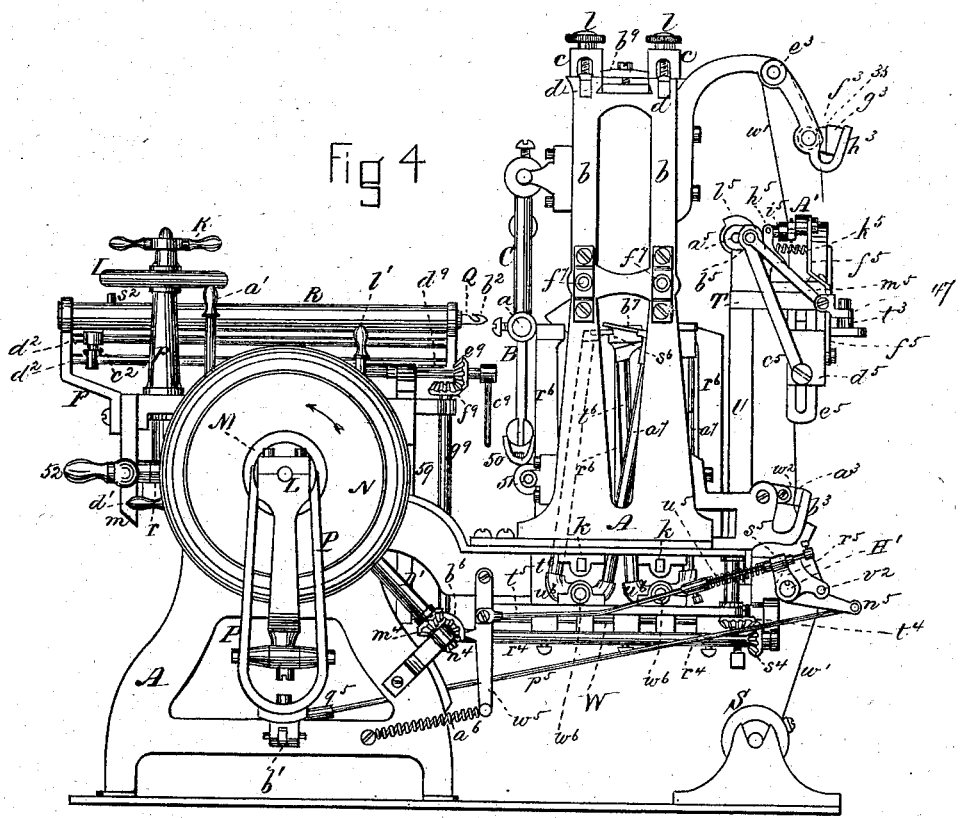
Figure 17:
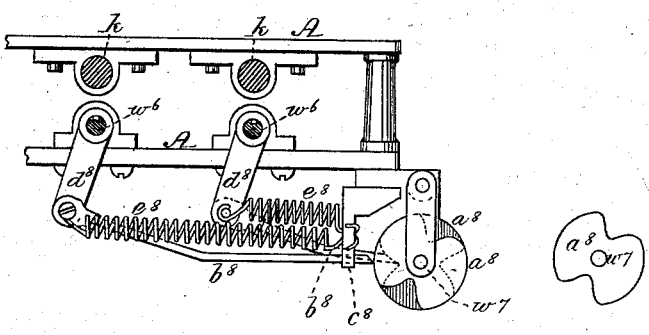

Figure 1 is a front elevation of our machine; Fig. 2, a rear elevation of the same; Fig. 3, an elevation of one side of the machine; Fig. 4, an elevation of the opposite side of the same; Fig. 5, a plan view; Fig. 6, a longitudinal vertical section through the center of the machine; Fig. 7, a vertical section on the line $x\ x$, Fig. 6; Fig. 8, a section of part of the machine on the line $y\ y$, Fig. 1; Fig. 9, a plan, enlarged, of a portion of the mechanism at the rear of the machine; Fig. 10, an inverted plan of Fig. 9; Fig. 11, a vertical section on the line $z\ z$, Fig. 9; Fig. 12, a horizontal section on the line $w\ w$, Fig. 11; Fig. 13, a vertical section on the line $v\ v$, Fig. 10; Figs. 14, 15, 16, 17, 18, 19, 20, 21, 22, 23, 24, 25, and 26, views of detached portions of the machine; Fig. 27, a perspective view of the stop-motion; Fig. 28, a perspective view, illustrating mechanism for supporting the heddles and operating on the eyes thereof; Fig. 29, an enlarged view of part of two of the heddles; Figs. 30, 31, 32, and 33, diagrams illustrating the devices for operating on the heddles; Fig. 34, an enlarged view of part of Fig. 31; Fig. 35, a transverse sectional view, showing the separating-arm; and Fig. 36, a perspective diagram, illustrating the operation of part of the machine.

Our invention consists of an organized machine embodying certain automatic devices by means of which the operation of drawing in warp-threads is performed in a very rapid and reliable manner, thus effecting an immense saving of time and labor.

The frame-work A of the machine may be of any suitable construction for supporting the mechanism described hereinafter.

B is the reed, the lower bar of which rests in supports or sockets 50 on a bar, 51, which is secured to the frame of the machine, the end bars of the reed being held in slots in the ends of rods $a$, each rod being fitted to a pendent arm, C, secured to a bar, $C^{10}$, attached to brackets on the frame. Each rod is confined to its arm by a set-screw, on loosening which the rods can be retracted when the reed has to be detached from the machine.

D E represent the heddles, which are hung up within the machine in a vertical position by means of hooks $c$, placed upon rods $d$, adapted to slide longitudinally in bearings at the top of the frame-work. These hooks $c$ fit into the eyes $f$ of the top bars, $e$, of the heddle-frames, the lower bars, $g$, of these frames having eyes $h$, into which fit hooks $i$, Figs. 6 and 28, secured to horizontal rods $k$, which are also movable in the direction of their length in suitable bearings in the frame-work, the upper hooks, $c$, which are kept in place by collars 45, being provided with thumb-screws $l$, by means of which the upper bars of the heddle-frames may be raised to stretch the heddle-cords tight and keep them in their proper position, the eyes $f$ and $h$ being those by which the heddles are suspended within the loom.

On the front portion of the frame, and adapted to suitable guides on the same, is a traversing carriage or slide, F, which is fed intermittently from right to left by means of a feed-screw, G, Fig. 1, adapted to suitable bearings on the frame-work, and extending entirely across the machine. This feed-screw G gears into a small worm-wheel, H, Fig. 8, connected, as by a feather and groove, to a vertical shaft, $n$, passing upward through the slide F, so that while it cannot turn independently of the shaft the latter can have a slight vertical movement independently of the wheel. The shaft $n$ passes through a post, $p$, on the carriage, and is furnished above the latter with a hand-wheel, I, which is secured in a similar manner to and must turn with the said shaft, although the latter can slide in the wheel to a limited extent. The upper end of the shaft is threaded and adapted to a hand-nut, $k$, on tightening which the shaft will be locked and the worm-wheel rendered immovable, so as to become a nut for the screw G when the latter has to traverse the slide, the loosening of the nut setting the shaft at liberty when it has to be used as a means of traversing the slide by hand, in which case the worm acts as a pinion and the feed-screw as a rack.

L is the driving-shaft, which has its bearings in the opposite sides of the frame-work and extends under the center of the slide F from side to side of the machine. On one end of this shaft, and loose thereon, is the driving-pulley M, Figs. 1, 5, and 7, also a balance-wheel, N, made in one piece with or otherwise connected to the pulley, the motion of the balance-wheel being communicated to the driving-shaft through the medium of a friction-wheel, $q$, against which bears the face of the balance-wheel N, and this friction-wheel, by means of feather-and-groove connections, can slide on but must turn with a short shaft, $r$, carrying at its inner end a bevel-wheel, $s$, which gears into a similar wheel, $t$, on the driving-shaft, Fig. 5.

The friction-wheel $q$ can be moved to and fro on the shaft by a hand-lever, $a'$, to diminish or increase the speed of the machine, as required. The shaft $r$ is provided with a crank-handle, 52, so that the machine may be operated by hand when required.

The lever P, by which the balance-wheel N is brought into contact with the friction-wheel $q$, is connected to a rod, $b'$, the latter being connected by an intermediate lever to a sliding rod, $c'$, having a handle, $d'$, by means of which the rod $c'$ may be moved in one direction to apply the balance-wheel to the friction-wheel, a spring, $f'$, tending to force the rod in a contrary direction.

It will be seen, on referring to Figs. 7, 23, and 27, that a catch-lever, 40, is pivoted in an arm, 41, jointed to a bracket on the frame-work, and that a projection, $e'$, on this catch-lever enters a notch in the rod $b'$, where it is retained by the action of a spring, 42. The object of this mechanism will be explained hereinafter.

On that end of the driving-shaft opposite to that which carries the balance-wheel, and outside the frame, is a cog-wheel, $g'$, also a bevel-wheel, $h'$, formed in the same piece with or otherwise connected to the said wheel $g'$ and both loose on the shaft, a spring on the latter tending to maintain a clutch, $i'$, turning with the shaft in gear with the wheels, and the clutch being operated through the medium of an arm on a rod, $k'$, by a hand-lever, $l'$, Fig. 2. The wheel $g'$ gears into an intermediate wheel, $m'$, which in turn drives a larger cog-wheel, $n'$, revolving on a stud projecting from the frame-work, Fig. 3.

To the outer face of the wheel $n'$ is secured a disk or plate, $p'$, Fig. 18, to which is attached a toothed segment, $q'$, the latter at each revolution of the wheel $n'$ engaging into a small wheel, $o'$, on the end of the feed-screw G, to which, when the machine is in operation, half a revolution is thus imparted, a single movement of the feed-screw taking place at the completion of each second revolution of the driving-shaft L, this being necessary in a machine adapted for operation on two heddles. If the machine is constructed for operating on three heddles, the gearing must be such that the feed of the carriage would take place at every third revolution of the driving-shaft, and so on.

Against the periphery of the disk $p'$ bears a disk, $s'$, secured to the feed-screw G, the disk $s'$ having two curved notches, 53, which fit the periphery of the disk $p'$, Figs. 3 and 18, and in this manner the feed-screw is locked in position after each movement and prevented from being accidentally turned before the proper time, which would produce derangement of the parts and imperfect work or breakage. When the segment $q'$ is brought around to engage the wheel $o'$ a curved notch, $t'$, in the disk $p'$ at the side of the segment allows the disk $s'$ to revolve, after which it is again locked, as before, by the disk $p'$ entering the next notch 53. The warp-threads $w'$ are successively drawn through the eyes, Fig. 28, of the heddles, and between the dents of the reed B by means of a long needle, Q, Figs. 4, 5, and 6, provided at its outer end with a hook, $b^2$. This needle is placed within a tubular casing, R, supported in a frame secured to the slide F, and is attached to a carrier, $c^2$, which slides on the parallel rods $d^2$ and extends up through a longitudinal slot, 46, in the under side of the casing R, the needle being attached to the carrier in such a manner as to admit of its being turned upon its axis, for a purpose described hereinafter.

To the needle-carrier $c^2$ is pivoted a rod, $e^2$, Fig. 5, which is jointed to a link, $f^2$, mounted on a stud, $g^2$, and to the rod $e^2$ is pivoted another rod, $h^2$, which is pivoted to a lever $i^2$, the latter having a pin passing through a slot in an arm, $k^2$, and this arm is secured to the strap of an eccentric, $l^2$, at the upper end of a vertical shaft, $m^2$, having its bearings in the slide. This shaft has at its lower end a bevel-wheel, $n^2$, which gears into a bevel-wheel, $p^2$, Fig. 7, arranged by means of a feather and groove to slide upon but to turn with the driving-shaft L, as the slide is traversed, the wheel $p^2$ being held in place, so as to be always in gear with the wheel $n^2$, by a forked hanger, $r^2$, extending down from the under side of the slide and fitting within a groove in the hub $q^2$ of the wheel $p^2$, Fig. 7; and thus, as the eccentric is rotated by the driving-shaft L, the needle Q is reciprocated through the medium of the connections described, a single revolution of the driving-shaft causing the needle to be moved once forward and once back.

To the needle Q is secured a pin, $s^2$, Fig. 6, which projects up through a longitudinal slot, $t^2$, in the tube R, the said slot, near the end of the tube, being so inclined as to turn the needle Q on its axis to the extent of a quarter of a revolution, in order to bring its hook on one side just before the completion of its forward movement, thus enabling the hook to catch the warp-thread $w'$, after which, as it commences to recede, the needle is turned back to its original position to again bring the hook on the upper side, thereby preventing it from catching the eyes of the heddles and the dents of the reed as it is drawn through them.

It will be advisable to give here a general explanation of the action of the reciprocating and intermittently-traversing needle Q in connection with other devices, so that the detailed description given hereinafter may be more easily understood.

Fig. 36 is a perspective outline, drawn without any regard to detailed construction, and in this figure F is the intermittently-fed slide and Q the reciprocating needle above referred to. At the rear of the slide there is an extension consisting in the present instance of a bar, W, and a post, U, to the top of which is attached a carrier, T, the latter having a projection with a sharp bearing-edge, $d^3$. The meaning we intend to convey by the term "sharp edge" is an edge made as sharp as possible without reducing it to a condition to sever the threads. In the same carrier, T, is a recess containing an oscillated disk provided with a hook, C'. Above the carrier T is a pair of nippers, A', which seizes a number of warp-threads and drags them along the sharp edge of the projection $d^3$ toward the disk, the hook of which seizes one of the warp-threads and moves it within range of the needle, the latter drawing the thread back through the heddles and through the reed. Thread after thread is thus operated on as the slide is fed intermittently in the direction of the arrow, the carrier T, its hooked-disk B, and the nippers A' traversing with the slide.

The sharp bearing-edge $d^3$, which is a vital part of the machine, is formed in the present instance on a plate or blade, $d^{10}$, secured to the carrier. There is a projection, $c^3$, on the carrier T, the object of which will be explained in the detailed description given hereinafter.

S, Figs 1, 2, 3, 4, and 6, is the warp-beam, the journals of which rest in suitable supports secured to the floor or to the frame-work, the beam being prevented from unwinding by a spring-pawl and ratchet wheel, or by any other suitable device. The warp-threads $w'$ from this beam pass up over a guide-rod, $v^2$, extending across the frame-work, and thence between a stationary bar, $w^2$, and a removable bar, $a^3$, the latter being confined in place by the inclined guides $b^3$ of the frame, so that by pressing the bar $a^3$ down the warp will be clamped tightly and prevented from slipping. Some of the warp-threads are always between the projection $c^3$ and bearing-edge $d^3$, Figs. 12 and 13, and as the threads are removed other warp-threads take their places against the sharp bearing-edge $d^3$ of the carrier T while the latter is traversed with the slide and needle.

The advantage of the sharp bearing-edge is that the warp-threads bearing against it have not the liability to ride over each other which they would have if they bore against a flat or rounded edge.

The entrance to the space between the projection $c^3$ and bearing-edge $d^3$ is made flaring by rounding the said projection and bearing-edge, so that as the carrier T is traversed the warp threads will be directed into the said space. The warp-threads are led over a horizontal rod, $e^3$, and thence down between a stationary rod or bar, $f^3$, and a removable clamping-bar, $g^3$, held in place by inclined guides $h^3$ on the frame-work, which cause the said bar $g^3$, when it is pushed down, to be wedged against the rod $f^3$. The inner side of the bar $g^3$, which presses against the warp-threads, is covered with felt, cloth, or equivalent material, 35, to allow each thread to be independently withdrawn by the needle Q without disturbing any of the adjacent threads. The bearing-edge $d^3$, of the carrier T is so situated in respect to the clamping devices which hold the warp-threads that the latter will bear against the said edge $d^3$. In other words, the said bearing-edge is traversed in a direction parallel with but at a short distance in front of the row of warp-threads.

We will now describe the manner in which the warp-threads $w'$ are successively selected and carried one at a time against the needle Q into a position to insure their being caught by its hook $b^2$, so as to be drawn thereby through the eyes of the heddles and between the dents of the reed.

The projection $c^3$ and the bearing-edge $d^3$ are at such distance apart as to hold the threads parallel or side by side in a single row and prevent them from riding over each other, Fig. 12, the threads nearest the inner end of the bearing-edge being stretched against the upper and lower stops or rests, $i^3$ $k^3$, Fig. 6, by the action of a pair of spring-nippers, A', which are pivoted at $l^3$ to the carrier T, and are vibrated and alternately opened and closed by mechanism described hereinafter, the jaws of these nippers opening on their descent, so as to pass clear of the threads, and closing thereon on their ascent with sufficient friction to take up any slack and produce a tension or strain on the said threads, the upward movement of the jaws in the arc of a circle having its center at $l^3$, tending also to draw the threads against the stops $i^3$ $k^3$, Fig. 2.

In the under side of the carrier T is formed a circular recess, $m^3$, Figs. 10 and 11, into which is fitted snugly, but so as to oscillate freely, a flanged disk, B', the latter being supported in place upon a stud, $n^3$, by means of a nut, $p^3$, and an intervening spring, $q^3$, this disk being oscillated on the said stud $n^3$ as a center through the medium of a connecting-rod, $r^3$, one end of which is attached to a crank-pin, $s^3$, on the under side of the disk and the other end to a lever, $t^3$, which is actuated by mechanism described hereinafter. Within this disk B' is pivoted a curved hook, C', Figs. 12 and 14, the point of which projects out through a slot in the side of the disk into such a position as to catch the innermost warp-thread of the series between the projection $c^3$ and bearing-edge $d^3$, and thus, as the hook C' is vibrated with the disk B', a single thread is selected and separated from the series and carried up against the needle Q, immediately behind the hook $b^2$ thereof, Fig. 14, the needle having been, just previous to the movement of the hook C', advanced into the proper position to receive the thread, and turned so that its hook $b^2$ will be presented on the side against which the thread is stretched by the hook C'. Hence on the retraction of the needle Q it will carry back with it a warp-thread.

In the side of the recess $m^3$ is an annular groove, $w^3$, into which the point of the hook C' projects, and in which it moves, this groove thus allowing the point of the hook to project out a sufficient distance to enable it to catch the thread.

In the bottom of the disk B is a curved slot, 58, into which the thread enters as the disk is oscillated, this slot thus causing the thread to be carried inward toward the center of the disk and against the needle Q, as required. Just before this, however, the thread is released by the opening of the nippers A', so as to avoid undue strain on and prevent the breakage of the thread.

In the periphery of the disk B' is a groove, $a^4$, opposite to the groove $w^3$ in the side of the recess $m^3$, the end of the plate $d^{10}$, which forms the bearing-edge $d^3$, extending into this groove $a^4$ above the hook C', thereby preventing the thread from getting into the space between the disk B' and wall of the recess $m^3$, and also preventing two threads from being caught by the hook C' at the same time. The distance to which the point of the hook C' projects is regulated by a screw, $b^4$, Fig. 21, or other equivalent device, as is necessary for coarser or finer threads, so that but a single thread may be seized at a time, the screw $b^4$ having a conical point, which bears against the inclined edge of the hook C', Fig. 21, and the spring $w^3$ pressing the hook against the screw. Just before the needle Q has arrived at the end of its forward movement it is brought into contact with a guard-plate, $c^4$, Fig. 14, secured to the under side of the carrier T, this guard serving to guide the needle into the exact position required to insure its receiving and catching the warp-thread when delivered by the hook C', the needle being thus supported and held up to its place against any tendency to spring to one side into such a position that it will miss a thread.

For convenience of construction the projection $c^3$ is provided with a shoe, $d^4$, and this shoe is furnished at its inner end with two small projections, $e^4$ $f^4$, the first overlapping and the second underlapping the oscillating disk B', and both serving as guards to prevent the thread from getting in between the disk and the sides of the recess $m^3$, in which it oscillates. The shoe $d^4$ is made adjustable on the projection $c^3$ by set-screws, as shown, so that it can be moved nearer to or farther from the bearing-edge $d^3$, as the thickness of the warp-threads may suggest.

At the inner end of the shoe $d^4$, Figs. 15 and 16, is a small central notch, $g^4$, to allow for the passage of the hook C', so that the thread about to be seized by the hook may remain between the projection $c^3$ and bearing-edge $d^3$ up to the time of seizure. To still further prevent the liability of the warp-threads becoming crossed or riding over each other while between the projection $c^3$ and bearing-edge $d^3$, and to straighten or flatten them out, we employ a bell-crank lever, $h^4$, Figs. 13 and 22, which is pivoted immediately beneath the bearing-edge $d^3$, the upper flattened edge, 60, of the lever $h^4$ extending out and fitting up close to and under the bearing-edge $d^3$. At each movement of the curved hook C', and just before it catches the thread, the lever $h^4$, Figs. 10 and 13, acted on by a spring, 39, is moved by a bent lever, $i^4$, which is actuated by a spring, $k^4$, attached to the adjacent lever, $t^3$. By this movement of the lever $h^4$ its edge 60 is drawn down from the bearing-edge $d^3$ in contact with the threads, the rubbing action of the edge 60 against the tightly-stretched threads thus serving to flatten or straighten them out if accidentally crossed, the point of the hook C' catching the thread at a point between the bearing-edge $d^3$ and the edge 60 of the lever $h^4$. By this device the catching of the wrong thread or of two threads at once is effectually prevented.

We will now describe the manner in which the motion of the driving-shaft L is communicated to the mechanism connected with the carrier T.

D' is an inclined shaft, Figs. 2, 3, and 4, carrying at its upper end a bevel-wheel, $l^4$, gearing into a similar wheel, $t$, Fig. 2, previously referred to, on the driving-shaft, and at the lower end of the said shaft D' is another bevel-wheel, $m^4$, gearing into a bevel-wheel, $n^4$, on a horizontal shaft, E', a bevel-wheel, $p^4$, being arranged by means of a feather and groove to slide on but turn with the said shaft, and having a grooved hub which is embraced by a forked hanger connected with the plate 59 of the slide F, Fig. 1. This wheel $p^4$ gears into another bevel-wheel, $q^4$, at one end of a shaft, $r^4$, which extends toward the rear of the machine, and has its bearings in arms projecting from the bar W, Figs. 2 and 4. At the opposite end of the shaft $r^4$ is a small bevel-wheel, $s^4$, which gears into a similar wheel, $t^4$, at the lower end of an inclined shaft, G', extending diagonally through the standard U, and having its bearings therein. To the upper end of the shaft G' is secured a bevel-wheel, $u^4$, which gears into a similar wheel, $w^4$, on the end of a horizontal shaft, $a^5$, having its bearings in supports on the carrier T, and having at its opposite end a crank, $b^5$, to which is pivoted a connecting-rod, $c^5$, the lower end of the latter being attached to a slide, $d^5$, which moves on a vertical guide, $e^5$, secured to the under side of the carrier T, Figs. 2, 4, 9, and 10. To the side of this slide $d^5$ is pivoted a bent rod, $f^5$, Figs. 2 and 4, the upper end of which is pivoted to the nippers A', the latter, through the connections described, being vibrated at the proper time. The nippers are composed of the bar $g^{10}$, pivoted to the carrier T, and the jaw $g^5$, pivoted to the bar. This movable jaw $g^5$ of the nippers is connected by a universal joint to the bell-crank lever $h^5$, pivoted to the carrier T, and caused by a spring, $k^5$, to bear against a cam, $l^5$, on the shaft $a^5$, so that when the cam rotates the said jaw $g^5$ will be opened and closed, Figs. 9 and 11. To the crank $b^5$ of the shaft $a^5$ is also pivoted another connecting-rod, $m^5$, the opposite end of which is attached by a universal joint, 47, to the lever $t^3$, which is thus operated at the proper times to produce the desired results.

We will now proceed to describe the mechanism employed for stopping the machine when a warp-thread breaks, or when a thread is missed by either the vibrating hook C' or the needle Q.

H' is a horizontal rock-shaft, Figs. 2, 4, 6, 24, and 27, having its bearings in the framework and carrying near one end a crank-arm, $n^5$, to which is pivoted a rod, $p^5$, the opposite end of which is provided with a wedge, $q^5$, Figs. 23 and 27, adapted to be introduced between the rod $b'$, previously referred to, and the lever 40, Fig. 7, for the purpose of depressing the latter and withdrawing its projection $e'$ from the notch in the said rod $b'$, thereby allowing the spring $f'$ to operate the shipper-lever P and stop the machine. An arm, $w^5$, hung to the frame, Figs. 4, 24, and 27, is vibrated continuously as the machine operates, by the combined action of a cam, $b^6$, on the shaft E', and a spring, $a^6$, and to this arm is jointed a rod, $t^5$, passing through a sleeve, $s^5$, pivoted to the arm $r^5$ on the shaft H'. Between the sleeve $s^5$ and a collar on the rod $t^5$ intervenes a spiral spring, $u^5$, so that the rod is at liberty to be reciprocated when the arm $r^5$ is stationary.

I', Figs. 2 and 27, is a bent arm provided with a collar or hub, $c^6$, adapted to slide on but move with the rock-shaft H', this collar and arm I' being caused to move with the standard U, forming part of the slide F, by a forked plate, $d^6$, which fits within an annular groove in the said collar. The upper end of the arm I' is held back, so as to prevent the shaft H' from being rocked through the medium of the rod $t^5$, by means of a weighted dog, $e^6$, at the end of a shaft, $f^6$, which carries at its inner end a flat plate, $g^6$, and against the latter bears the thread when unbroken, the thread keeping the dog $e^6$ in a position to hold the arm I' back. Should the thread break, however, or not be carried under the plate $g^6$ by the needle Q, the dog $e^6$ will turn by its own weight and release the arm I', when the crank $r^5$ will be operated through the medium of the rod $t^5$, the spring $u^5$ being a sufficiently-rigid medium through which to rock the shaft and cause the wedge $q^5$ to operate the lever 40 and release the rod $b'$, when the shipper-lever will be actuated by the spring $f'$ and the machine stopped. As long as the thread is unbroken and remains in contact with the plate $q^6$ the dog $e^6$ retains the lever I' and holds the shaft stationary without being disturbed by the reciprocating rod $t^5$.

While we prefer the stop-motion which we have described above, other devices may be used for stopping the machine when the thread breaks.

We will now proceed to describe the heddles and the manner in which their eyes are selected and separated one by one in proper order and held in position for the passage of the hooked needle Q.

Each of the heddles D E is constructed in the manner shown in the perspective view, Fig. 29, in which, however, the eyes and heddle-cords are arranged at a much greater distance apart than in the actual heddle, in order that our description may be more readily understood. The cords below every eye of the heddle pass around the lower bar, $g$; but the two cords $a^{12}$ of one eye, 62, Fig. 29, pass up and over one side of the upper bar, $e$, while the cords $a^{11}$, above the next eye, 63, pass upward and over the opposite side of the said bar $e$, and this alternation of the upper cords of the eye is continued throughout the entire heddle. This heddle is of the kind made by machinery, and is in common use. To the lower bar, $g$, of each heddle is temporarily attached, by means of dowel-pins $k^6$ or otherwise, a bar, $l^6$, Figs. 25 and 28, to which are pivoted two links, $m^6$, the latter being jointed to a bar, $n^6$, part of which is shown in Fig. 30. This device is introduced longitudinally between the cords of the heddles in the manner best observed in Fig. 30, and by moving the bar $n^6$ endwise, and thereby raising the same, it will be brought directly under the eyes of the heddles, Figs. 28 and 30, and will cause the faces of each eye to be presented toward the front of the machine.

Between the cords of each heddle, above the eyes, passes a rock-shaft, $p^6$, in the manner shown in Fig. 28 and more clearly in Figs. 30 and 35, the said shaft being adapted to bearings on the frame-work, these bearings and devices for actuating the rock-shaft being described hereinafter.

A separating-arm, $q^6$, (shown in perspective in Figs. 20 and 30,) is arranged, by means of a feather and groove, to slide on but rock with the shaft $p^6$, and to traverse intermittently in unison with the feed of the carriage and needle. It should be remarked here that there is a sudden intermittent endwise movement of the heddles, effected in the manner described hereinafter. We will now explain that function of this oscillating separating-arm which consists, by co-operating with the endwise movement of the heddles and the traversing of the said separating-arm in unison with the slide F, in selecting eye after eye of the heddle for presentation to the needle.

The vibration of each separating-arm is intermittent, as it hesitates, while in a central position, in moving in both directions. In Fig. 35 the separating-arm $q^6$, appertaining to the heddle D, has reached the limit of its movement in the direction of the arrow, and in moving to this position has passed away from the eye 62, of which $a^{12}$ are the upper cords. At the same time the separating-arm $q^6$ keeps back the eye 63, and consequently all the other eyes, whether their upper cords pass on one side or the other of the upper bar, for if the eye 63 be kept back none of the other eyes can pass it, for it must be remembered that the bar $n^6$ maintains the eyes of all the heddle-cords in line. Hence the keeping of one eye back must result in keeping back the adjoining eyes. Just as the separating-arm $q^6$ was leaving the eye 62 there was a sudden short reciprocating endwise movement of the heddle, which shook the eye 62 free from the other eyes, as there is sometimes a tendency of the cords of the eyes to adhere to each other. On the return movement of the separating-arm in a direction contrary to that pointed out by the arrow, Fig. 35, it stops midway between the two limits of its movement, for a purpose explained hereinafter, and then completes its movement in a direction contrary to that pointed out by the arrow, in doing which it leaves the eye 63 holding all the others back, and another endwise movement of the heddle frees the said eye 63 from the other eyes.

Having now described the selecting and separating functions of the separating-arms, we will proceed to describe other duties which they perform in connection with other devices.

In Fig. 30 the needle Q is approaching the heddle D in the direction of its arrow, and the arm $q^6$ of the heddle is stationary, but about to move in the direction of its arrow, and separates the eye 62 of the heddle from the remaining eyes. Before the point of the needle Q reaches the eye 62 of the heddle, however, the separating-arm $q^6$ has pushed the said eye 62 against a finger, $s^6$, on an arm, $t^6$, Fig. 31, referred to hereinafter, and the eye 62 is thus held between the separating-arm and finger, within range of the needle Q, which passes through the eye and thence close to the separating-arm $q^6$ of the next heddle, E, without going through one of the eyes of the latter heddle, as the nearest eye to the needle of this heddle has been moved out of the way of the needle by a finger, $b^7$, in a manner explained hereinafter. After the hook of the needle has seized a warp-thread it recedes and drags the thread through the eye 62 of the heddle D and through the reed. After the needle in receding has passed from the eye 62 of the heddle D, and dragged the warp-thread through the same, the finger $b^7$, acting on the knot at the lower end of the eye 62, moves the said eye from the position shown in Fig. 31 to that shown in Fig. 32, the end of the finger $s^6$ yielding in order to permit the eye to pass from one position to the other. Immediately after reaching the position shown in Fig. 32 the fingers $s^6$ and $b^7$ move back to their original positions, Fig. 33, (it will be seen hereinafter that the fingers move together,) and the eye 62 is now held out of the range of the needle by the finger $s^6$. In the meantime the separating-arm $q^6$ is in a position to keep that eye of the heddle next to the eye 62 out of the way of the needle, and the eye 62 of the heddle D and the adjacent eyes of the same heddle are so far apart that on the next forward movement of the needle it will pass between these two eyes, but through one of the eyes of the heddle E, which eye has been prepared for the passage through it of the needle in the same manner and by devices similar to those described above as acting on the eye 62 of the heddle D.

It will thus be seen that during one stroke, or forward and rearward movement, of the needle it passes through the eye of one heddle, D, and between the eyes of the other heddle, E, and drags a warp-thread through the course it has pursued, and that during the next stroke of the needle it passes through the reed, between the eyes of the heddle D, through one of the eyes of the heddle E, and drags another warp-thread through this course, so that a warp-thread is drawn through an eye of one heddle and through the reed, and the next warp-thread through an eye of the other heddle and through the reed; and this alternation is continued until a warp-thread has been passed through every eye of both heddles.

As regards the detailed construction of the separating-arm $p^6$, it will be observed on reference to the perspective view, Fig. 20, that a finger, $c^7$, is pivoted to one side of the said separating-arm, the outer edge of this finger being curved and the lower end provided with a projection which slides in a segmental recess, $d^7$, at the lower edge of the separating-arm, the movement of the finger on the arm being restricted by the ends of the recess, so that it cannot pass beyond the corners $e^7$ of the said separating-arm. When the arm $q^6$ is oscillated the finger is practically at rest, being confined between the cords of the heddles, and bears thereon nearly down to the bottom of the eyes when the separating-arm is vibrated to one side to the limit of its movement, and by thus bearing on the heddle-cords it acts as a guard and effectually prevents the corners $e^7$ of the arm $q^6$ from catching against the eye next to the eye 62 on its return movement, as shown in Fig. 35.

As regards the finger $s^6$, it is best to make it in the manner illustrated in Fig. 34—that is, to provide it with a light spring, $z$, projecting beyond the rigid portion of the finger and bearing against the finger $b^7$—so that when an eye of the heddle has to pass from the position shown in Fig. 31 to the position shown in Fig. 32 the spring will readily yield. The finger $s^6$, however, may be constructed in a different manner, so as to yield as described.

In order that the several operations above described may be effectually performed, it is essential that there should be the following movements of the different parts referred to:

First. A reciprocating movement of the needle, and the intermittent traversing of the same with the slide F. The mechanism for effecting these movements has been already described.

Second. The intermittent traversing of the carrier T, and the devices attached thereto, in unison with the feed of the slide. This, together with mechanism for operating these devices, has also been explained.

Third. The intermittent sliding movement of the separating-arms in unison with the traverse of the slide and needle.

Fourth. The oscillating movement of the fingers $s^6$ and $b^7$.

Fifth. The oscillating movement imparted to the separating-arms.

Sixth. The intermittent endwise-reciprocating movement of the heddles.

We will now proceed to describe the mechanism employed for effecting the third, fourth, fifth, and sixth movements.

As regards the third movement—the intermittent sliding motion of the separating-arms—it will be observed that three posts, $r^6$, Fig. 6, are secured at their lower ends to the rod W, and hence are intermittently traversed with the slide F, and in the top of each of these posts is a groove, 65, as shown in Fig. 6, and also in Fig. 28, in which, however, but two posts and one heddle are shown. The lower edge of the separating-arm $q^6$, appertaining to the first heddle, D, is always in the groove of the first post or that of the middle post, or in the grooves of both of these posts, and the separating-arm appertaining to the second heddle, E, is always in the groove of the middle post or that of the last post, or in the grooves of both of these posts, and hence the separating-arms must traverse on their rock-shafts in unison with the intermittent traverse of the carriage F and its needle Q.

As regards the fourth movement—the oscillation of the fingers—it will be observed on reference to Figs. 26, 28, 31, 32, and 33 that the finger $s^6$ is at the upper end of an arm, $t^6$, and the finger $b^7$ at the upper end of an arm, $a^7$, both arms being connected to a hub, $u^6$, on the shaft $w^6$, which has its bearings on the frame-work of the machine, the hub, with its two arms, being arranged by means of a feather and groove to slide on but rock with the said shaft. At the same time the hub and its arms and finger traverse with the rod W, connected to the carriage, for a collar, $z'$, which may be adjusted on the said rod W and secured after adjustment, has a plate, $z^3$, projecting into a groove in the hub $u^6$, Fig. 26. There is for each heddle the above-described device, and two shafts, $w^6$, Fig. 6, for the two devices, or, if there be three heddles, three shafts for three devices. A vertical shaft, $i^7$, Figs. 3 and 7, carries at its upper end a bevel-wheel, $k^7$, which gears into a similar wheel, $h'$, above referred to, on the driving-shaft L, and to this shaft $i^7$ is also secured a bevel-pinion, $l^7$, gearing into a bevel-wheel, $m^7$, on a horizontal shaft, $n^7$, at the opposite end of which is a wheel, $p^7$, gearing into a wheel, $q^7$, on a horizontal shaft, $r^7$, the shafts $n^7$ and $r^7$ being supported in suitable bearings on the side of the frame-work A. At the rear end of the shaft $r^7$ is a bevel-wheel, $s^7$, which gears into a similar wheel, $t^7$, on a short shaft, $w^7$, carrying at its opposite end two cams, $a^8$, against which bear two rods, $b^8$, Fig. 17, which are supported near the cams by passing through holes in a stationary piece, $c^8$, the opposite ends of these rods being pivoted to arms $d^8$, secured to the rock-shafts $w^6$, and the rods being maintained in contact with the cams by means of spiral springs $e^8$, which serve to move the shafts $w^6$ in one direction, the cams moving them in the opposite direction, and in this manner the cams and springs produce at the exact times required the proper oscillating movements of the fingers $s^6$ and $b^7$ as the hubs $u^6$ are moved along on the shafts $w^6$, as above described.

As regards the fifth movement—the oscillation of the separating-arms—the shaft $r^7$ carries a bevel-wheel, $f^8$, which gears into a similar wheel on the lower end of a vertical shaft, $g^8$, carrying at its upper end a bevel-wheel, which gears into a wheel, $h^8$, on a horizontal shaft, $i^8$, supported in bearings on the uprights $b$ of the frame-work. This shaft $i^8$ carries two scroll-cams, $k^8$, the groove in each of which is provided with two straight portions and two double inclines, $l^8$, on opposite sides of the cam, Figs. 3 and 28. Into these grooves fit the lower ends of two arms, $m^8$, extending down from the short shafts $h^7$, forming continuations of the shafts $p^6$, and thus, as the cams $k^8$ are rotated, the desired rocking movements are alternately imparted to the separating-arms $q^6$, the double inclines $l^8$ of one cam being opposite to the centers of the spaces between those of the other cam, in order that the movements of the two rock-shafts and their separating-arms may alternate as required.

As regards the sixth movement—the endwise-reciprocating motion of the heddles—it will be seen that the faces of the cams $k^8$ are provided with projections or tappets $n^8$, Figs. 1 and 28, which, as the cams revolve, are brought into contact with the bent lower ends of two rods, $p^8$, which pass through guides $q^8$, and are pivoted at their upper ends to studs projecting from two vertical rods, $r^8$, which are thus lifted each time, one of the projections $n^8$ striking and passing up out of contact with the end of its rod $p^8$. The vertical rods $r^8$ are each pivoted at their upper and lower ends to rockers $s^8$, Figs. 2 and 28, these rockers being pivoted upon the opposite sides of supporting-pieces $t^8$, attached to the frame-work. The inner flat faces of these rockers $s^8$ fit squarely against the toe-pieces $w^8$, secured to the ends of the sliding rods $d$ and $k$, and thus, as the rockers are oscillated through the connections described, the rods $d$ and $k$ are moved in the direction of their length to operate the heddles in one direction, the spiral springs $a^9$ returning them to their original positions on the reverse movement of the rockers $s^8$. The rods $d$ and $k$ are flattened on their sides where they slide in the frame-work, and the recesses or grooves in which they slide are open at the top to admit of their ready removal, the rods being confined in place at one end by a bar or button, $b^9$, which may be turned to one side when the rods are to be taken out. Soon after the hooked needle Q has drawn a warp-thread through one of the eyes of a heddle and through the reed a revolving finger or arm, $c^9$, Figs. 3, 4, and 28, strikes the thread and draws it out of the hook $b^2$ of the needle, and casts it over to one side, out of the way, thus preventing the needle from carrying the thread back again on its return-stroke, as it might otherwise do. This revolving finger is attached to the end of a horizontal shaft, $d^9$, Figs. 5 and 28, having its bearings in the slide F and carrying a bevel-wheel, $e^9$, gearing into a similar wheel, $f^9$, on the top of a vertical shaft, $g^9$, a bevel-wheel on the lower end of which gears into the wheel $p^4$ on the shaft E', and in this manner the finger $c^9$ is caused to perform its work of drawing the thread out of the needle at the proper time, which is when the said point has been drawn back out of the path of the finger, so that the latter will clear it as it rotates. Each of the rock-shafts $p^6$ is made removable to enable it to be easily taken out of the machine, one end fitting into a spring-socket, $f^7$, while the other end slides within a socket, $g^7$, at the end of a short rock-shaft, $h^7$, Fig. 19, having its bearing in the frame-work, and forming a longitudinal extension of the shaft $p^6$, a small projection in the socket $g^7$ entering the groove in the scroll-cam $p^6$, whereby the two shafts are caused to move together, as before described.

The above-described machine is constructed to operate upon two heddles only; but a machine may be made for operating upon three or more heddles, in which case a series of automatic devices the same as above described will be required for each heddle—that is to say, there must be for each additional heddle a separating-arm, $q^6$, fingers $s^6$ and $b^7$, and mechanism for operating the same; also, mechanism for imparting a reciprocating endwise movement to each additional heddle. The gearing by which the driving-shaft is connected with the feed-screw will also require to be changed, as the number of strokes of the needle Q, between each movement of the feed-screw G and slide F, must correspond to the number of heddles suspended within and operated upon by the machine; and the relative sizes of the wheels must be such that for two heddles two revolutions of the driving-shaft will cause the segment $q'$ to engage with the gear $o'$ on the end of the feed-screw, for three heddles three revolutions of the driving-shaft, and so on, the segment $q'$ having the exact number of teeth necessary to turn the feed-screw and advance the slide F the proper distance to insure the accurate operation of the needle Q.

In operating the machine it is necessary that the first two or three eyes of the heddles at each end should have two warp-threads passed through them instead of one, in order to form the selvage in the usual manner. This is effected by operating the clutch $i'$ by the hand-lever $l'$ at the required time, so that the bevel-wheel $h'$ will not be rotated by the driving-shaft, thus throwing out of action the various devices for operating upon the heddles and producing the feed of the carriage until the needle Q has drawn two threads instead of one through the eye, when the mechanism is again brought into action to bring the next eye into position, after which it is again thrown out to cause the second eye to receive two threads, and so on until the selvage has been drawn on that side, when the entire mechanism is thrown into action and allowed to continue in action until the needle Q has nearly reached the opposite end of the heddles, when the operation of alternately disconnecting and connecting the mechanism controlled by the clutch $i'$ is repeated to cause the selvage to be drawn at that end of the heddles, as required.

Having explained the construction of the different parts composing the machine and the operation of different features, we will now describe in brief terms the operation of the principal operating parts in relation to each other.

We will suppose that the needle Q has reached the limit of its rearward movement, that the screw G has fed the slide F to the desired extent, and that the needle is about to commence its forward movement. The warp-thread about to be seized by the needle is with others between the jaws of the nippers A' (which, however, have not yet seized the thread) and against the bearing-edge $d^3$, the point of the hook C' of the disk B' is at its greatest distance from the thread, which it has to subsequently seize, the separating-arm $q^6$, appertaining to the heddle D, is in the act of pushing the eye 62 of the said heddle against the finger $s^6$, which is stationary, and the separating-arm $q^6$, appertaining to the heddle E, is quiescent in its central position, where it keeps the eyes of the said heddle E away from the course of the needle. We will now suppose that the needle is in the act of moving forward and has passed through the reed. Before its point reaches the eye 62 of the heddle D the separating arm of that heddle has completed its duty, and is stationary in its central position, while it holds the eye 62 of the heddle against the finger $s^6$, so that it will be in a proper position to receive the point of the needle. In the meantime the separating-arm and fingers $s^6$ and $b^7$, appertaining to the other heddle, E, are in the act of performing the duty of separating the eye last threaded of that heddle from the other eyes, so as to clear the way for the needle and prevent it from passing through any eye of the said heddle. The needle, having passed through the reed, through the eye 62 of the heddle D, and between the threaded eye and next eye of the heddle E, is approaching the limit of its forward movement. Before it reaches this point, however, the nippers A' have seized a number of threads, including that destined to be caught by the hook of the needle, and have drawn the threads upward, as well as laterally against the fingers $l^2$ and $k^3$, so that the first thread of the series will be pressed against the periphery of the oscillating disk B' and in a position to be seized by the hook C' of the said disk. When the needle has reached, or very nearly reached, the limit of its forward movement, Fig. 14, the disk B' suddenly turns to such an extent that its pointed hook seizes the first warp-thread and drags it into the curved slot 58 of the disk and against the needle, which had turned on its axis before reaching this point. The needle no sooner reaches the limit of its forward movement than it commences to return, in doing which its hook catches the warp-thread, and the disk turns back so that its hook loses control of the thread, which is now drawn away, by the receding needle, from between the rod $f^3$ and the felt of the bar $g^3$, and away from the other warp-threads, through the heddle E, without passing through one of its eyes, through the eye 62 of the heddle D, and through the reed, after which its thread is removed from the needle by the hook $c^0$. While the needle is in the act of thus receding an eye of the heddle E is being prepared by the devices and movements above described for receiving the needle during its next forward movement, and the eyes of the heddle D are being so arranged in the manner and by the appliances described that during the next forward movement of the needle it will pass between eyes and not through an eye of the said heddle. When the needle has arrived, or nearly arrived, at the limit of its rearward movement, the carriage is fed to the desired extent and a repetition of the above-described operations takes place.

We do not wish to limit ourselves to the mechanism described, through the medium of which the essential parts are actuated from the driving-shaft, as this mechanism can be varied without departing from the main features of our invention.

We claim as our invention—

1. The combination, in an organized machine for drawing in warp-threads, of a frame-work, a slide adapted to guides on the same, a hooked needle carried by and adapted to a guide or guides on the slide, mechanism for imparting the within-described intermittent feed to the slide and reciprocating movement to the needle, with heddle-holders and a reed-holder, whereby the heddles and reed are retained in a position parallel, or nearly so, with each other and presented to the reciprocating needle, all substantially as set forth.

2. The combination of the intermittently-fed slide and the reciprocating hooked needle carried by the slide with mechanism whereby the said needle is caused to turn on its axis as it is concluding its outward movement and to turn back again as it commences its inward movement, substantially as described.

3. The combination of the intermittently-fed slide F, its slotted tubular casing R, and the needle Q with the guided needle-carrier $c^2$ and mechanism whereby the within-described reciprocating motion is imparted to the said carrier and needle, substantially as specified.

4. The combination of the intermittently-fed slide F, the slotted casing R, the needle and guided needle-carrier, the driving-shaft L, shaft $m^2$, wheels $n^2$ and $p^2$, and eccentric $l^2$ on the said shaft $m^2$ with mechanism through the medium of which the eccentric is caused to reciprocate the carrier and needle, all substantially as described.

5. The combination of the intermittently-fed slide, the slotted casing R on the same, the needle, the needle-carrier adapted to guides on the slide, the driving-shaft L, the eccentric $l^2$, and mechanism by which it is driven from the said shaft L, with the eccentric-rod $k^2$, arm $i^2$, rod $h^2$, arm $e^2$, and link $f^2$, all connected directly or indirectly to the said slide, substantially as set forth.

6. The combination of the slide F, the feed-screw G, and mechanism for intermittently turning the same, the shaft $n$, and the worm-wheel H, constructed to turn with but slide to a limited extent on the shaft, with the devices, substantially as described, through the medium of which the said shaft $n$ can be locked and released, as set forth.

7. The combination of the slide F, the feed-screw G, and mechanism for intermittently turning the same, with the worm-wheel H, the shaft $n$, having its bearings in the slide, the hand-wheel I on the shaft, the post $p$, and the nut $k$, adapted to the threaded upper end of the said shaft $n$, all substantially as specified.

8. The shaft L, the wheel N, and belt-pulley thereon, both being loose on the said shaft, the shaft $r$, geared to said shaft, and the friction-wheel $q$, constructed to slide on but turn with the said shaft $r$, in combination with devices whereby the friction-wheel can be moved to and fro on its shaft, all substantially as described.

9. The combination of the shaft L, the wheel N, and its belt-pulley, both loose on the said shaft, the shaft $r$, geared to the said shaft L, the friction-wheel $q$ on the said shaft $r$, an arm or lever, P, a spring for causing the arm to move the said wheel N away from the friction-wheel, and a catch, 40, or other equivalent retainer for causing the said arm P to maintain the wheel N in contact with the friction-wheel, in opposition to the action of the spring, all substantially as set forth.

10. The combination of the driving-shaft L, the slide F, mechanism through the medium of which the slide is intermittently fed by the said shaft, the needle carried by the slide, devices through the medium of which the said needle is reciprocated by the said shaft L, and a device whereby the actuating mechanism of the slide may be disconnected from that which actuates the needle, substantially as set forth.

11. The combination, in an organized machine for drawing in warp-threads, of the following elements, namely: first, the slide F and needle Q; second, mechanism for intermittently feeding the said slide and needle and reciprocating the latter; third, a device for retaining the whole of the warp-threads; fourth, a carrier, T, having a sharp bearing-edge, $d^3$, for warp-threads; and, fifth, devices whereby the said carrier is caused to traverse in unison with the slide, all substantially as set forth.

12. The combination of the intermittently traversed and reciprocated hooked needle, a carrier, T, traversed in unison with the needle and provided with a sharp bearing-edge, $d^3$, for the warp-threads, and a hook, with mechanism for oscillating the same and causing it to seize a warp-thread directly from the said sharp bearing-edge and move it within range of the needle, substantially as set forth.

13. The intermittently traversed and reciprocating needle Q, a traversed carrier, T, provided with a sharp bearing-edge, $d^3$, for warp-threads, a recess, $m^3$, in the said carrier, and the horizontal disk B′, provided with a hook, in combination with mechanism for operating the disk and causing its hook to seize the last warp-thread of the series bearing against the said sharp edge $d^3$, all substantially as set forth.

14. The combination of the traversed carrier T, provided with a bearing-edge, $d^3$, the disk B′ and pivoted hook, and mechanism for operating the disk, with nippers A′ and devices for operating the same and causing them to seize a number of warp-threads and direct them toward the periphery of the disk, all substantially as set forth.

15. The carrier T, having the bearing-edge $d^3$ and projection $c^3$, all being constructed substantially as described.

16. The carrier T, having the bearing-edge $d^3$ and the projection $c^3$, provided with an adjustable shoe, $d^4$, all being constructed substantially as set forth.

17. The carrier T, provided with the bearing-edge $d^3$, rounded at its outer end, and with the projection $c^3$ and its shoe $d^4$, also rounded at its outer end, all being constructed, as set forth, so as to present a flaring entrance, $c^{10}$, to the space between the said bearing-edges and shoe, substantially as specified.

18. The combination of the within-described disk B′, having a curved slot, 58, with the pivoted hook C′ and spring $w^3$ for acting on the same, all being constructed substantially as described.

19. The combination of the within-described disk and its pivoted hook with a carrier, T, having a recess, $m^3$, and a groove in the walls of the recess for receiving the point of the hook, all being constructed substantially as set forth.

20. The combination of the disk having a groove in its periphery and a pivoted hook with the carrier T, having the recess $m^3$ and a groove in the walls of the recess, all being constructed substantially as described.

21. The combination of the disk B′, having a groove in its periphery, with the carrier T, provided with a plate, $d^{10}$, the edge of which constitutes the bearing-edge $d^3$ and the inner end of which enters the groove in the said disk, all being constructed substantially as specified.

22. The combination, with the disk B′, of the carrier T, having the projection $c^3$, provided with a shoe, $d^4$, formed with a central notch for the passage of the hook of the disk, and a projection overlapping and another underlapping the same, all being constructed substantially as described.

23. The combination of the oscillated disk with its pivoted hook, and devices, substantially as described, for regulating the extent of the outward movement of the hook, as set forth.

24. The combination of the carrier T, having the bearing edge $d^3$, with a rubbing device connected with the carrier and mechanism for causing the said device to act on the threads below the said bearing-edge, all substantially as set forth.

25. The combination of the carrier T, having the bearing-edge $d^3$, with the lever $h^4$ and mechanism for operating the same, substantially as described.

26. The combination of the nippers A′ and mechanism for operating the same, and the carrier T, having the bearing-edge $d^3$ and projection $c^3$, with the pivoted lever $h^4$ and mechanism for operating the same, substantially as specified.

27. The combination of the nippers A′, and mechanism for operating the same, with the stops $i^3$ and $k^3$, substantially as specified.

28. The carrier T and the within-described nippers, consisting of a bar, $g^{10}$, pivoted at $l^3$ to the said carrier, and a jaw, $g^5$, pivoted to the said bar, in combination with mechanism whereby both bar and jaw are vibrated, and whereby the jaw is opened and closed, substantially as described.

29. The combination of the carrier T with the nippers consisting of the bar $g^{10}$, pivoted to the said carrier, and the jaw $g^5$, pivoted to the said bar $g^{10}$, with the shaft $a^5$, the driving-shaft L, mechanism by which the said shaft $a^5$ is driven from the shaft L, the cam $b^5$, the lever $h^5$, a spring acting on the jaw, a crank, $b^5$, on the said shaft $a^5$, and mechanism whereby a vibrating motion is imparted from the said crank to the bar $g^{10}$ and jaw $g^5$, all substantially as set forth.

30. The combination of the carrier T, having the recess $m^3$, the disk B', the fixed shaft $n^3$, on which the disk is caused to oscillate, the nut $p^3$ on the shaft, and the spring $q^3$, all being constructed substantially as set forth.

31. The combination of the reciprocating and traversed needle Q, the oscillated disk B', and its pivoted hook with the plate $c^4$, substantially as described.

32. The combination of the hooked needle and mechanism for reciprocating and traversing the same and turning it on its axis, and devices for holding the warp-thread, with mechanism for seizing the warp-thread and presenting it to the needle, all substantially as set forth.

33. The combination of devices for holding a heddle with the shaft $p^6$, mechanism for imparting the within-described intermittent vibrating motion to the shaft, the separating-arm $q^6$, constructed to slide on and vibrate with the shaft, the intermittently-fed slide F, and grooved attachments thereto for receiving the lower edge of the said separating-arm, all substantially as specified.

34. The combination of the intermittently vibrated and traversed separating-arm $q^6$ and its finger $c^7$ with the heddle-holders and mechanism for imparting a reciprocating endwise motion to the said holders, substantially as described.

35. The combination of the reciprocating and intermittently-traversed needle, the heddle-holders, the separating-arm $q^6$, and finger $s^6$ with mechanism for vibrating the said arm and finger and traversing both in unison with the traverse of the needle, all substantially as set forth.

36. The combination of the reciprocating and traversed needle Q, the intermittently-vibrated separating-arm $q^6$, holders for the heddles, the finger $b^7$, and mechanism whereby the said finger is actuated to operate on a heddle-eye, and is traversed in unison with the needle, substantially as set forth.

37. The combination of the intermittently traversed and reciprocated needle Q with the fingers $s^6$ and $b^7$, and with mechanism for traversing the said fingers in unison with the traverse of the needle, and for imparting the within-described movement to the fingers, substantially as described.

38. The combination of the separating-arm $q^6$ and the fingers $s^6$ and $b^7$ with mechanism for operating the same, substantially as described.

39. The combination of the finger $b^7$ with the yielding finger $s^6$, adapted to bear against the said finger $b^7$, substantially as specified.

40. The combination of the vibrated fingers $s^6$ and $b^7$ with the heddle-holders and mechanism for imparting a reciprocating endwise motion to the carrier, substantially as described.

41. The combination of the intermittently-vibrated separating-arm $q^6$ and the vibrated fingers with the reciprocated needle Q and mechanism whereby the said arm, fingers, and needle are traversed simultaneously, substantially as set forth.

42. The combination of the reciprocating and traversed needle Q with the stripper $c^9$ and mechanism whereby the said stripper is caused to draw the thread away from the needle, substantially as described.

43. The combination of the heddle-holders and the bar $l^6$, constructed for attachment to and removal from the lower bar, $g$, of a heddle, with the bar $n^6$ and links $m^6$, substantially as described.

44. The within-described reed-holder, the same consisting of supports carried by the frame-work and adapted to the lower bar of the reed, the shaft $c$, adapted to bearings in the frame-work, arms on the said shaft, and retractile rods $a\,a$, carried by the arms and slotted to receive the ends of the reed, all substantially as set forth.

45. The combination of the reciprocating and traversed needle Q, the weighted lever $e^6$ and its plate $g^6$, both traversed in unison with the needle, the wheel N, a friction-wheel through the medium of which the said wheel is caused to drive the machine, an arm for controlling the wheel, a retainer for maintaining it in contact with the friction-wheel, and mechanism whereby the said lever, in falling, is caused to release the retainer and permit a spring to move the wheel N away from the friction-wheel, all substantially as set forth.

Witness our hands this 26th day of May, A. D. 1881.

LEWIS PERRY SHERMAN.
RICHMOND H. INGERSOLL.
GEORGE MOORE.

In presence of—
P. E. TESCHEMACHER,
W. J. CAMBRIDGE.